(12) United States Patent
Nagashima

(10) Patent No.: US 8,951,459 B2
(45) Date of Patent: Feb. 10, 2015

(54) CONNECTOR PRODUCING METHOD AND MOLDING DIE

(75) Inventor: Shinyu Nagashima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 816 days.

(21) Appl. No.: 12/844,866

(22) Filed: Jul. 28, 2010

(65) Prior Publication Data

US 2011/0034089 A1 Feb. 10, 2011

(30) Foreign Application Priority Data

Aug. 10, 2009 (JP) ................................ 2009-185881
Aug. 19, 2009 (JP) ................................ 2009-190170

(51) Int. Cl.

| B29C 45/14 | (2006.01) |
|---|---|
| H01R 13/504 | (2006.01) |
| H01R 43/24 | (2006.01) |
| B29C 45/00 | (2006.01) |

(52) U.S. Cl.
CPC ........ *H01R 13/504* (2013.01); *B29C 45/14065* (2013.01); *B29C 45/14639* (2013.01); *H01R 43/24* (2013.01); *B29C 45/0053* (2013.01); *B29C 2045/0079* (2013.01)
USPC ........................................................ 264/275

(58) Field of Classification Search
CPC .............. B29C 45/14; B29C 45/14065; B29C 45/14122; B29C 45/14639
USPC ............ 264/241, 259, 271.1, 272.11, 272.15, 264/275

See application file for complete search history.

(56) References Cited

U.S. PATENT DOCUMENTS

| 4,304,032 A * | 12/1981 | MacMillan et al. ......... 29/25.42 |
| 2003/0194918 A1* | 10/2003 | Fricke et al. .................. 439/835 |

FOREIGN PATENT DOCUMENTS

| JP | 9-161866 | 6/1997 |
| JP | 2001085091 | * 3/2001 |
| JP | 2006-114245 | 4/2006 |

* cited by examiner

*Primary Examiner* — Larry Thrower
*Assistant Examiner* — Xue Liu
(74) *Attorney, Agent, or Firm* — Gerald E. Hespos; Michael J. Porco; Matthew T. Hespos

(57) ABSTRACT

A method is provided for producing a connector so that a terminal fitting is unlikely to move. A terminal fitting (20) is set in a molding die assembly that has a first die (60) and a second die (70). Resin then is injected to mold housing (40) including the terminal fitting (20) as an insert. A potting material (49) then is injected into a recess (45) in the housing (40) to produce a male connector. The first die (60) has a tab insertion hole (62) for fixing the terminal fitting (20), and the second die (70) has a gate (72) for injecting the resin. A cavity (81) is formed by placing the second die (70) on the first die (60) so that a projection (26) on the terminal fitting 20 is sandwiched between fitting pressing portions on the dies (60, 70).

3 Claims, 9 Drawing Sheets

CONNECTOR PRODUCING METHOD AND MOLDING DIE

BACKGROUND OF THE INVENTION

1. Field of the Invention

The invention relates to a connector producing method, a molding die and a connector with good fluid resistance.

2. Description of the Related Art

Japanese Unexamined Patent Publication No. 2006-114245 and FIG. 9 herein disclose a connector to be installed in the body of a vehicle for grounding a part of a wiring harness circuit to the body. With reference to FIG. 9, a connector of this type includes a housing 140 molded with a terminal fitting 120 inserted therein. The terminal fitting 120 has first and second L-shaped bends 121, 122 to form a crank shape embedded in a resin of the housing 140. A tab 123 projects from the first L-shaped bend 121 and is connected with a terminal fitting of a mating connector (not shown). An installing portion 124 projects from the second L-shaped bend 122 and is fixed to a mounting part (not shown).

A connecting/separating force may be exerted upon inserting/withdrawing the mating connector and may concentrate on the second L-shaped bend 122 near the mounting part to which the terminal fitting 120 is fixed. Thus, the second L-shaped bend 122 may be deformed significantly and the deformation may cause the resin 141 of the housing 140 to crack.

The housing 140 of this connector is molded with a lower die 150 that has an upper opening edge and an upper die 160 that has a lower opening edge. The terminal fitting 120 is set in the lower die 150 so that the tab 123 of the terminal fitting 120 is inserted into a tab insertion hole 151 in the lower die 150 and so that the installing portion 124 of the terminal fitting 120 projects up. The upper die 160 then is lowered from above and the installing portion 124 of the terminal fitting 120 enters an installing-portion insertion hole 161. Insert molding then is performed. The respective insertion holes 151, 161 need to have a small clearance. Thus, the terminal fitting 120 that is to be molded in the housing 140 with the above-described molding die is in an unstable state and is slightly movable in the insertion holes when resin is injected into the molding die. As a result, the position of the terminal fitting 120 varies in the completed housing 140.

Japanese Unexamined Patent Publication No. H09-161866 shows another connector to be installed in the body of a vehicle for grounding a part of a wiring harness circuit to the body. The connector shown in Japanese Unexamined Patent Publication No. H09-161866 is formed by insert molding so that a terminal fitting penetrates through a synthetic resin housing. A small clearance may be formed between the terminal fitting and the resin due to a difference in coefficient of thermal expansion between the resin and the terminal fitting. Thus, a recess is formed in a wall where the terminal fitting is embedded, and a potting material is filled into the recess to seal the clearance between the terminal fitting and the resin if the connector is required to be water resistant.

The potting material is expensive and hence there is a demand for saving a filling volume as much as possible. On the other hand, the thickness of the terminal fitting is determined in view of required strength and cannot be made thinner than necessary. The diameter of the recess could be decreased to reduce the amount of potting material. However, a clearance between the opening of the recess and the outer periphery of the terminal fitting then becomes smaller, thereby reducing space for an injection nozzle to inject the potting material into the recess and significantly complicating the injection of the potting material. Specifically, the potting material may adhere to a connecting portion of the terminal fitting, thereby adversely affecting the connectability of the terminal fitting.

The terminal fitting could be thinned to ensure a sufficient insertion space for the injection nozzle. However, a thinner terminal is less rigid. The thin terminal fitting may deformed by forces generated while connecting/separating the connector or may be affected by the pressure of the injected resin during insert molding to vary its embedded position. Forces generated during curing shrinkage of the resin or potting material also may incline a thin terminal fitting in an unpredictable direction.

The invention was developed in view of the above, and objects thereof are to provide a connector producing method, molding die and connector to improve operability during manufacture, to prevent breakage of the resin covering a terminal fitting, to allow precise position of the terminal fitting and to allow easier injection of potting material.

SUMMARY OF THE INVENTION

The invention relates to a method for producing a connector that includes at least one terminal fitting and a housing that is made integral to the terminal fitting by insert molding with the terminal fitting set in a molding die assembly. The terminal fitting has a bent or crank shape with a tab extending in a connecting direction of a mating connector and one or more bends. The molding die assembly comprises first and second dies that are opened in an extending direction of the tab. A cavity for forming the housing is defined between the first and second dies. The first die has a tab insertion hole for receiving the tab. A fitting pressing portion is formed on mating faces of the first and second dies for sandwiching and fixing the terminal fitting at the time of die clamping and a gate is arranged in the second die for injecting resin into the cavity substantially in a direction in which the tab is inserted into the tab insertion hole.

The bent or crank shape of the terminal fitting preferably is defined by the tab extending in a connecting direction of a mating connector, a fixing portion parallel to the tab for fixing the connector to a mounting part, and a coupling that couples the fixing portion and the tab via first and second L-shaped bends. The coupling, the tab and the fixing portion are substantially parallel and at different levels. The bend closer to the tab is at least partly in the cavity and the bend closer to the fixing portion is outside the cavity.

The fitting pressing portion preferably at least partly sandwiches and fixes the coupling of the terminal fitting at the time of die clamping.

The terminal fitting can be fixed at two positions in the molding die, namely, in the tab insertion hole and at the fitting pressing portion. Further, the terminal fitting can be fixed reliably in the molding die without shaking because the terminal fitting is sandwiched and fixed in the fitting pressing portion at the time of die clamping unlike a fixing method that inserts a terminal fitting into a hole. Thus, the position accuracy of the terminal fitting is improved. Furthermore, the gate for injecting the resin is in the second die and the resin is injected in the pressing direction of the terminal fitting into the tab insertion hole. Therefore, the injected resin presses the terminal fitting strongly against the first die. In this respect as well, the terminal fitting is fixed to improve the position accuracy.

The L-shaped bend that is closer to the fixing portion is formed outside the housing. This L-shaped bend could be deformed to change a bending degree when the mating connector is inserted or withdrawn with a large connecting or separating force. However, this deformation does not break or otherwise affect the resin.

The tab of the terminal fitting preferably has at least one inclined surface that extends obliquely from a position slightly closer to the bend than a central part toward the bend. The inclined surface gradually increases the thickness of the tab. The method further comprises a step of inserting the inclined surface of the terminal fitting against at least one corresponding slant in the tab insertion hole in the first die. Accordingly, forces acting on the terminal fitting by injected resin press the inclined surface of the terminal fitting being against the slant of the first die. As a result, there is no likelihood that the leading end of the tab will be pressed against the bottom end of the tab insertion hole and be deformed. Further, the slants are pressed against each other to press the terminal fitting sideways and bring the terminal fitting into close contact with the side wall of the tab insertion hole. Thus, the position accuracy of the terminal fitting is improved.

The invention also relates to a molding die assembly for insert molding a connector that includes at least one terminal fitting and a housing that is made integral to the terminal fitting by insert molding. The terminal fitting has a bent or cranked shape with a tab extending in a connecting direction of a mating connector and one or more bends. The molding die assembly comprises first and second dies that can be opened in an extending direction of the tab. The first and second dies are configured to form a cavity for forming the housing therebetween in a closed state. The first die is formed with a tab insertion hole for receiving the tab. A fitting pressing portion is formed on mating faces of the first and second dies for sandwiching and fixing the terminal fitting at the time of die clamping. A gate for injecting resin into the cavity substantially in a direction, in which the tab portion is inserted into the tab insertion hole, is arranged in the second die.

The first die preferably is formed with a slant for receiving the at least one inclined surface of the terminal fitting inserted into the tab insertion hole.

The invention also relates to a connector with a housing made of synthetic resin and including a receptacle. The connector also has at least one terminal fitting with a tab that projects from the back wall of the receptacle and extends substantially in a connecting direction of a mating connector. A recess is formed in the back wall of the housing and around the terminal fitting. A resin material is injected into the recess and adheres to the terminal fitting. The tab of the terminal fitting is thinner than a remaining base portion of the terminal fitting and a boundary part between the tab and the base is in the recess and at least partly embedded in the resin. The thinned portion of the tab provides a larger insertion space in the receptacle for an injection nozzle so that the injection nozzle can be inserted more easily. A potting material can be filled without adhering to a connecting portion of the terminal fitting. The terminal fitting has a thick structure except at the tab. Thus, the terminal fitting has a high rigidity and is not likely to be deformed either during an operation of connecting/separating the connector or by the pressure of the injected resin during insert molding. Further, the boundary between the tab and the base is in a part touching the potting material, i.e. in the recess. Therefore, the base of the tab is strong even and the tab will not incline or deform in response to curing shrinkage of the potting material injected into the recess.

The tab preferably is deviated in one direction from the center of the recess. Accordingly, the insertion space for the injection nozzle is even larger.

The terminal fitting may have an incline that gradually thins the tab at positions spaced from the base. Thus, a force on the boundary part due to curing shrinkage of the potting material is distributed to the entire incline and the effect on the boundary part does not concentrate on one position. Accordingly, the terminal fitting will not deform.

The recess may taper to widen toward the opening edge. A raised portion is formed at the bottom surface of the recess and is raised toward the terminal fitting. Accordingly, the filling volume of the potting material is reduced and a slanted guiding surface is formed at the opening of an insertion hole for the tab in a die used to mold the housing while ensuring a large injection opening in the recess for the potting material.

These and other objects, features and advantages of the invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
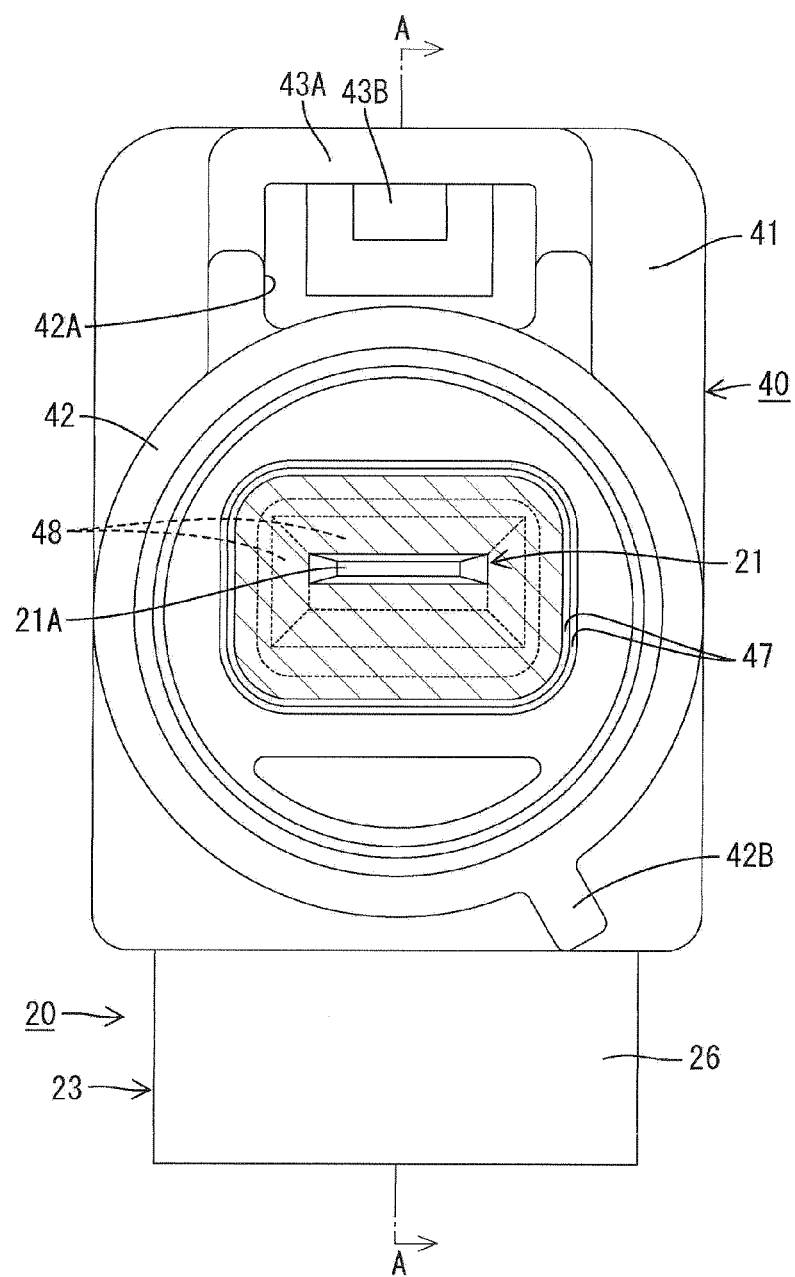
FIG. 1 is a front view of a connector in accordance with the invention.
Figure 2:
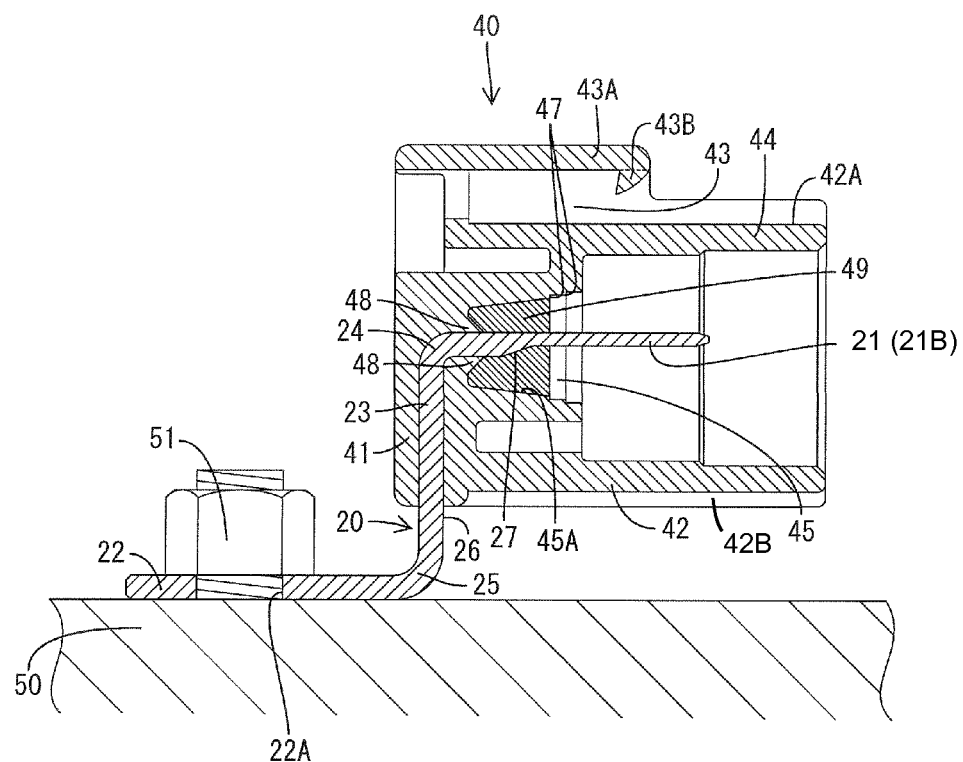
FIG. 2 is a section along A-A of FIG. 1.

A male connector in accordance with the invention is shown in FIGS. 1 and 2 and has a housing 40 united with at least one terminal fitting 20 by insert molding.

Figure 3:
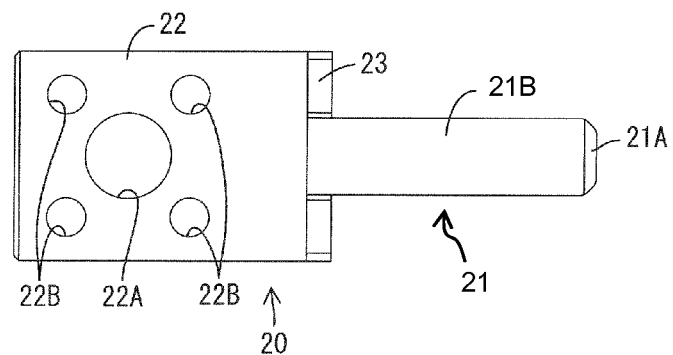
FIG. 3 is a top view of a terminal fitting.
Figure 4:
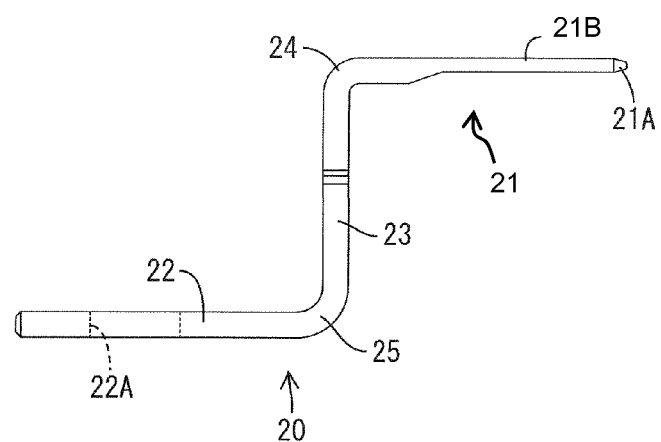
FIG. 4 is a side view of the terminal fitting.
Figure 5:
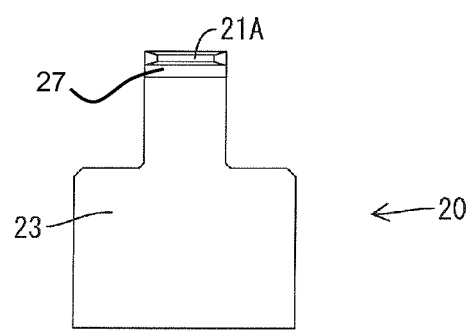
FIG. 5 is a front view of the terminal fitting.

As shown in FIGS. 3 to 5, the terminal fitting 20 is formed from a plate-like metal piece and includes a long narrow tab 21 at one end, a wide fixing portion 22 at an opposite end and a stepped or tapered coupling 23 between the tab 21 and the fixing portion 22. The tab 21 is configured to be connected with a female terminal fitting. The fixing portion 22 is a plate that extends toward opposite widthwise sides to be more than about twice, preferably about three times as wide as the tab 21.

The tab 21 has a tip 21A that is tapered at four surrounding sides, and the fixing portion 22 is formed with a bolt hole 22A for receiving a fixing bolt 51. The bolt hole 22A is slightly closer to the free end than the center. Through holes 22B are near the bolt hole 22A and are smaller than the bolt hole 22A.

The tab 21 and the fixing portion 22 are substantially parallel, and the entire terminal fitting 20 has a crank-shape with the tab 21 joined to the coupling 23 by a first substantially L-shaped bend 24 and the fixing portion 22 joined to the coupling 23 by a second substantially L-shaped bend 25.

As shown in FIGS. 1 and 2, the housing 40 has a substantially cylindrical tube 42 at a front end and a back wall 41 at a rear end. The back wall 41 preferably has a substantially rectangular or polygonal outer shape when viewed from the front.

A receptacle 44 is defined adjacent the front end of the cylindrical tube 42 and can accommodate a female connector. A guide groove 42A extends in forward and backward directions above the receptacle 44 and can receive an engaging piece on the unillustrated female connector at the time of connection with the female connector. An accommodating portion 43 is defined by a ceiling wall 43A spaced out from the tube 42 at the rear of the guide groove 42A. An engaging claw 43B extends from the ceiling wall 43A and engages the engaging piece to hold the two connectors in a properly connected state.

A guide rib 42B projects out a lower position of the outer peripheral wall of the cylindrical tube 42 and extends from the opening edge to the back wall 41. The guide rib 42B slides in a groove of the female connector (not shown) so that the male connector is guided to a specified position in the female connector.

At least one recess 45 is formed in an intermediate position of the back wall 41 and opens toward the receptacle 44 of the cylindrical tube 42. The recess 45 is tapered to narrow from a generally rectangular or polygonal opening edge toward a bottom surface.

The recess 45 has two steps 47 arranged one after the other toward the bottom surface and at least one raised portion 48 raised toward the center at the bottom surface. The tab 21 of the terminal fitting 20 projects substantially from the center of the raised portion 48 and extends to a substantially a central part of the receptacle 44 in a longitudinal connecting direction of the housing 40.

A potting material 49 that adheres to the tab 21 and an inner wall surface 45A of the recess 45 is filled into the recess 45 up to the step 47 for fluidproofing or waterproofing. Visual presence of the step 49 indicates the injected amount of resin.

The terminal fitting 20 is embedded in resin from a boundary between the recess 45 and the housing 40 (i.e. a position slightly behind the center of the tab 21) to a part of the coupling 23 slightly closer to the second L-shaped bend 25 than the center of the coupling 23. Additionally, the second L-shaped bend 25 is arranged outside the housing 40. The coupling 23 of the terminal fitting 20 forms part of a projection 26 extending from the second L-shaped bend 25 to the lower end surface of the back wall 41 of the housing 40 and supports the housing 40 at a position away from a mounting part 50.

The fixing portion 22 extends back from the second L-shaped bend 25 and is fixed to the mounting part 50 by inserting the fixing bolt 51 through the bolt hole 22A and into the mounting part 50.

The tab 21 of the terminal fitting 20 has an inclined portion 27 in the recess 45 to thin the tab 21 gradually toward the leading end of the tab 21. A thinned portion 21B is formed by flattening the tab 21 from the inclined portion 27 to the tapered tip 21A of the tab 21 from the lower side. The thinned portion 21B enables the tab 21 to project at a position deviated up from the center of the recess 45 at the opening edge of the recess 45.

The recess 45 is tapered from the opening edge toward the bottom surface, and at least one raised portion 48 is raised toward the projecting tab 21 at the bottom surface.

The coupling 23 of the terminal fitting 20 constitutes part of a projection 26 that supports the housing 40 at a position away from the mounting part 50 and projects toward the mounting part 50 from the housing 40. The tab 21 of the terminal fitting 20 is formed with the inclined portion 27 in the recess 45 and gradually or stepwisely thickens toward the first L-shaped bend 24. Thus, the terminal fitting comprises the inclined portion 27 in an intermediate portion along its longitudinal direction having a reduced cross-sectional area and a thickness of the plate material is modified gradually or stepwise between the front distal end of the tab 21 and the first bend 24.

Figure 6:
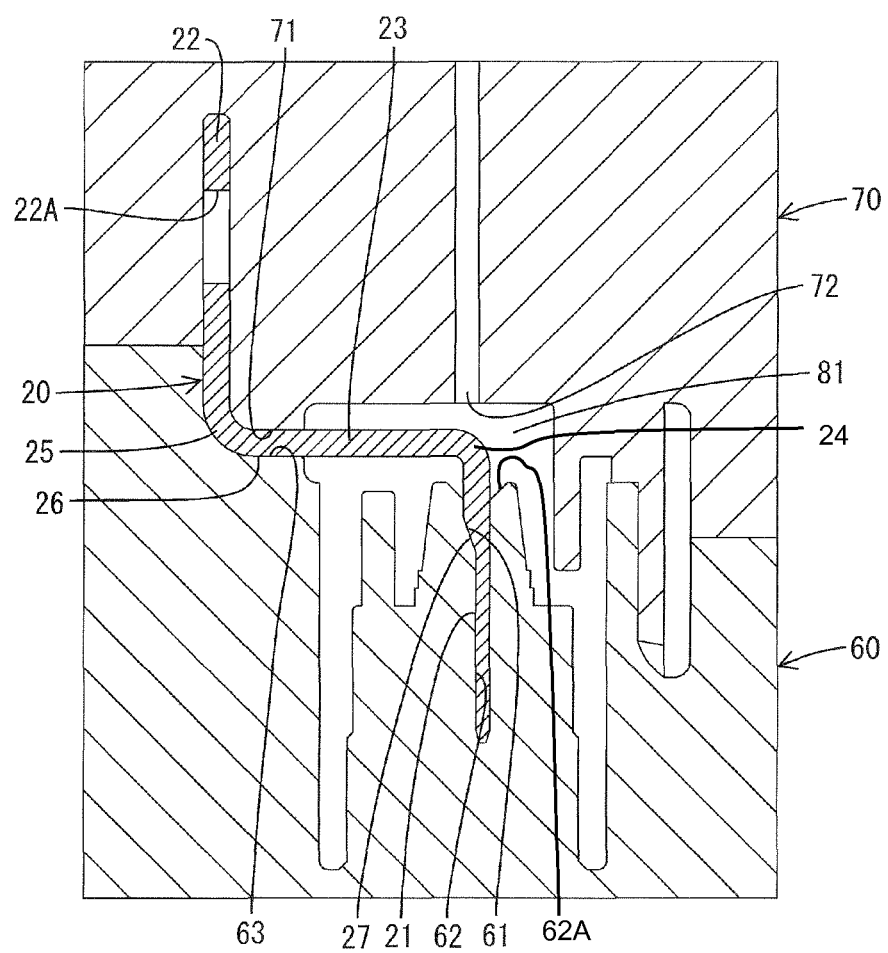
FIG. 6 is a section showing the terminal fitting set in first and second dies.
Figure 7:
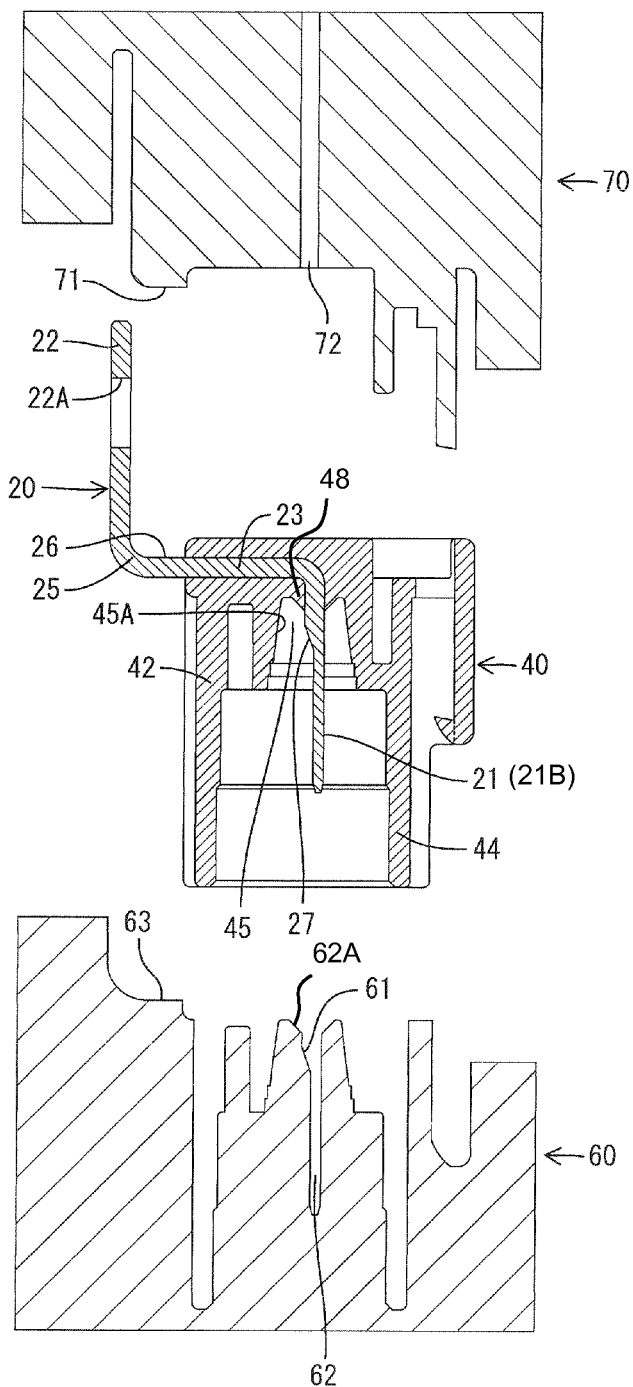
FIG. 7 is a section showing the first and second dies opened after insert molding.
Figure 8:
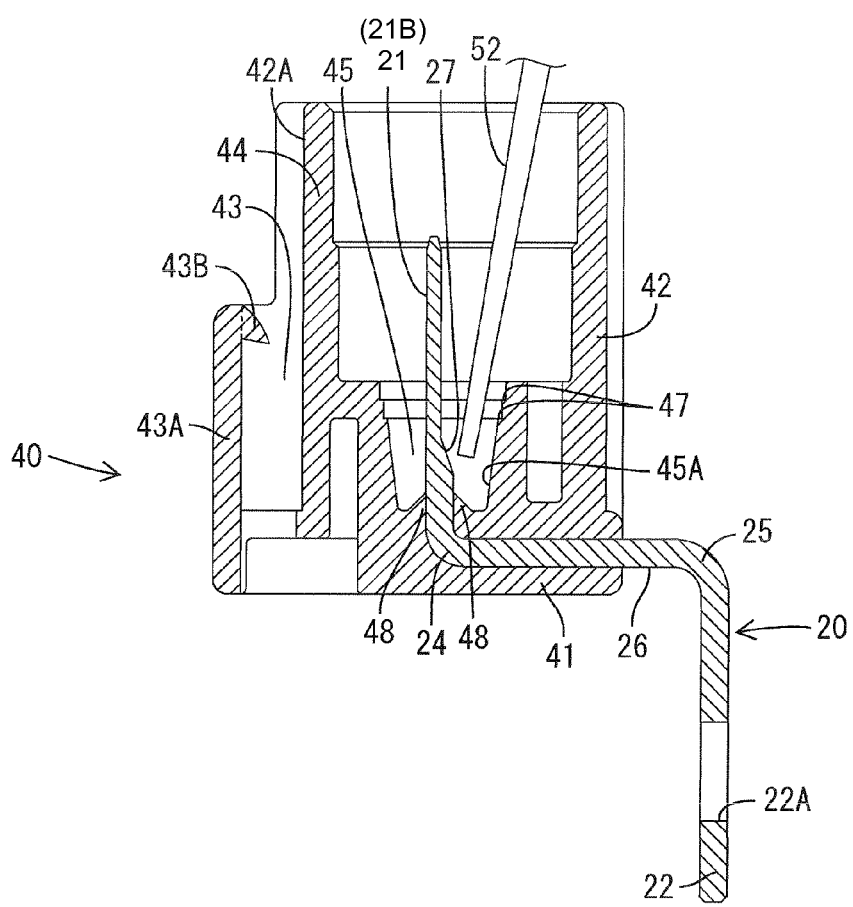
FIG. 8 is a section showing a state where an injection nozzle is set in a housing after insert molding.
Figure 9:
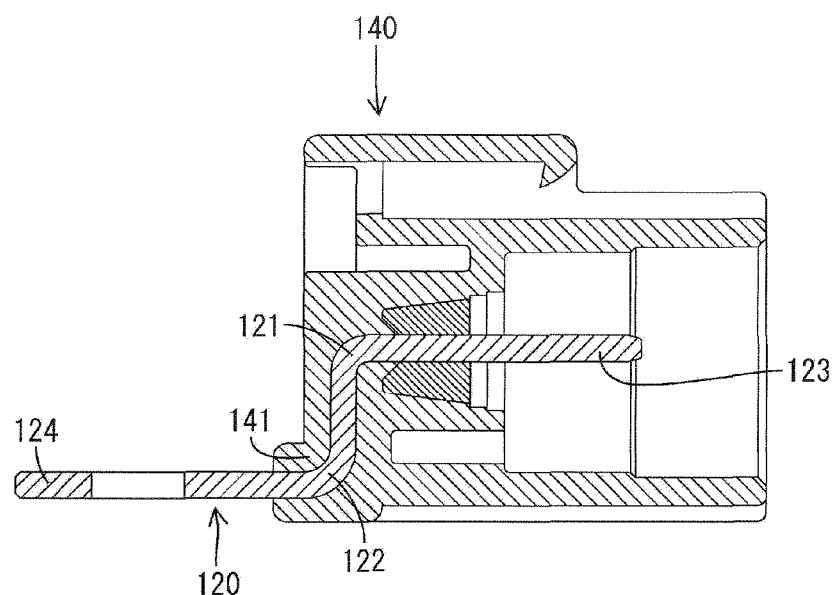
FIG. 9 is a section of a conventional connector.
Figure 10:
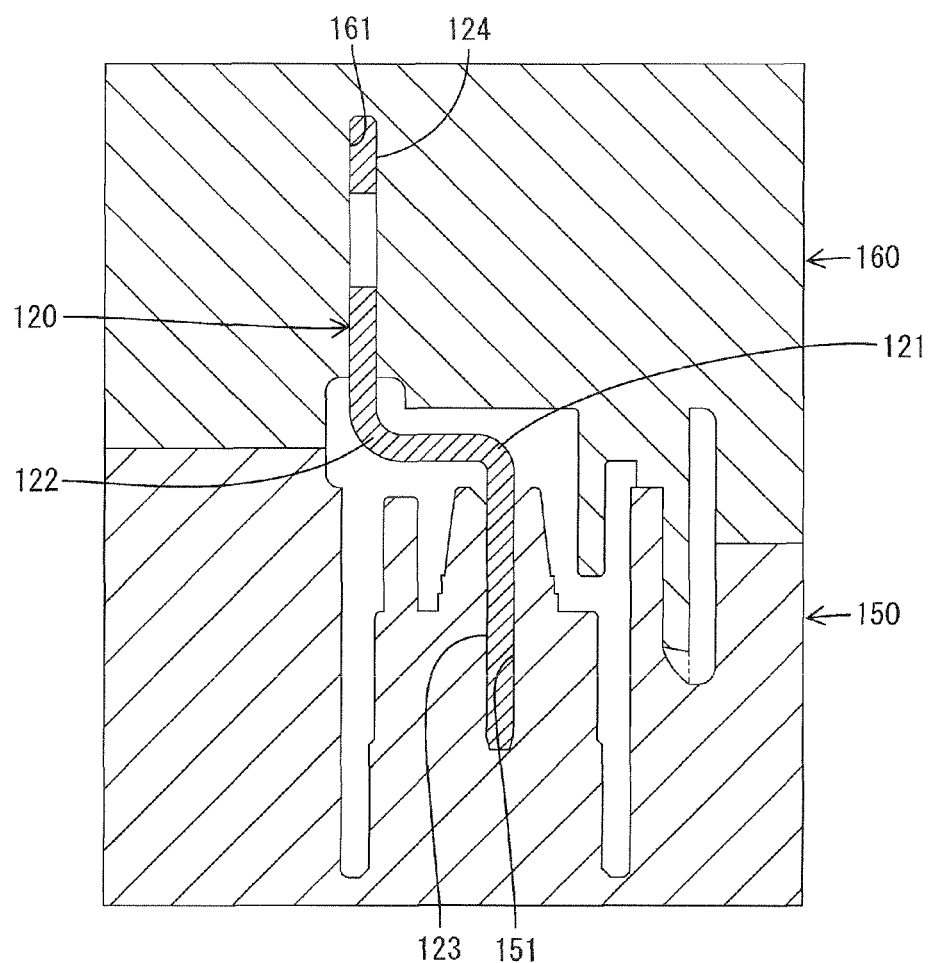
FIG. 10 is a section showing a conventional connector producing method.
Figure 11:
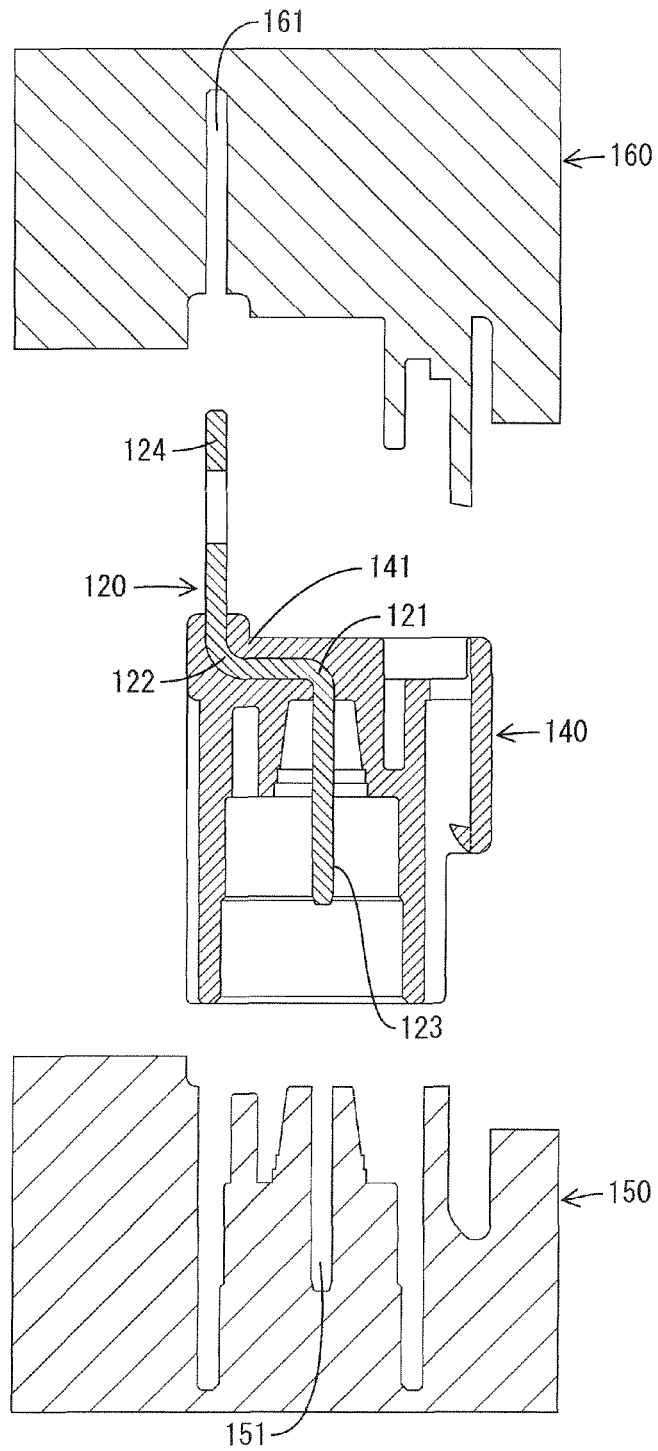
FIG. 11 is a section showing opened dies in the conventional producing method.

As shown in FIGS. 6 and 7, the at least one terminal fitting 20 is set in a molding die assembly defined as a combination of a first die 60 and a second die 70. Resin is injected to perform insert molding. The dies are opened in the connecting direction to take out the molded housing 40 including the terminal fitting 20 partly embedded in the resin.

The first die 60 for forming a front part of the housing 40 is arranged with an opening edge thereof at the top. The tab 21 of the terminal fitting 20 is inserted into a tab insertion hole 62 in a substantially a central part of the first die 60. The tab insertion hole 62 has a slant 61 corresponding to the inclined portion 27 of the tab 21 at a position slightly closer to the back side than the opening edge, as shown in FIG. 6. The inclined portion 27 of the tab portion 21 comes into contact with the slant 61 of the tab insertion hole 62 in the process of inserting the tab 21, and a force acting in an inserting direction of the tab 21 is exerted to the slant 61. Thus, the terminal fitting 20 is received and fixed by being pressed sideways.

The tab insertion hole 62 has a slanted guiding surface 62A slightly behind the opening edge as shown in FIG. 6. The inclined portion 27 of the tab 21 is received by the slant 61. Thus, the terminal fitting 20 is held and the projecting portion 26 and the second L-shaped bend 25 of the terminal fitting 20 are set in a first fitting pressing portion 63.

The slanted guiding surface 62A ensures that the leading end of the tab 21 of the terminal fitting 20 will not deform even though the thinned portion 21B of the tab 21 with low rigidity is inserted into the tab insertion hole 62. Additionally, the raised portion 48 reduces the filling volume of the recess 45.

The projection 26 and the second L-shaped bend 25 of the terminal fitting 20 are set in a first fitting pressing portion 63 with which they are substantially in contact when the inclined portion 27 contacts the slant 61.

After the terminal fitting 20 is set, the molding die is clamped or fixed by placing the second die 70 on the first die 60 with an opening edge of the second die 70 at the bottom. At this time, the projection 26 of the terminal fitting 20 is sandwiched and fixed by a fitting pressing portion composed of the first fitting pressing portion 63 of the first die 60 and a second fitting pressing portion 71 paired with the first fitting pressing portion 63.

A synthetic resin then is injected from a gate 72 in the second die 70 above the first L-shaped bend 24 of the terminal fitting 20 and enters a cavity 81 between the dies 60 and 70 to perform insert molding with the terminal fitting 20 as an insert. The opening of the gate 72 into the cavity 81 faces the first bend 24 of the terminal fitting and a part of the first die 60 is shaped to form the raised portion 48 of the housing 40.

The synthetic resin injected from the gate 72 exerts a force acts on the terminal fitting 20 in a pressing direction into the tab insertion hole 62 and the inclined portion 27 of the terminal fitting 20 is pressed against the slant 61 of the tab insertion hole 62. Thus, the terminal fitting 20 is pressed sideways to be held in close contact with the side wall of the tab insertion hole 62 and the terminal fitting 20 is fixed further.

The synthetic resin injected into the cavity 81 then is cured and the dies are opened in the connecting direction as shown in FIG. 7 to take the housing 40 out.

The potting material 49 is a synthetic resin and is injected into the recess 45 of the just completed connector housing 40 by an injection nozzle 52. The potting material 49 adheres to the inner wall surface 45A of the recess 45 of the housing 40 and the tab 21 of the terminal fitting 20 to achieve fluid- or waterproofing. The potting material 49 then is cured to complete the male connector.

The terminal fitting 20 is fixed at two positions, i.e. at the fitting pressing portion and the slant 62, when the synthetic resin is injected into the cavity 81. Thus, the terminal fitting 20 is fixed in the molding die without shaking by being sandwiched and fixed unlike the conventional method. Further, it is possible to produce the connector with high position accuracy of the terminal fitting 20 by arranging the gate 72 at the position where the terminal fitting 20 is pressed against the first die 60.

The L-shaped bend where the connecting force concentrates is outside the housing 40. Thus, the resin is not affected even if this L-shaped bend is deformed. Therefore, the resin will not be broken by insertion and withdrawal of the connector.

An angle of inclination of the inner wall surface 45A of the recess 45 is set at about 5° to 10°, for example, at about 7°. The angle of inclination of about 5° to 10° enables the housing 40 to be taken out from the molding die easily when the molding die is opened after the housing 40 is molded. The angle of inclination of the inner wall surface 45A is larger than an angle of inclination of 1° that generally is used, and hence the surface roughness of the inner wall surface 45A is larger than normal and the inner wall 45A and the potting material 49 adhere well to each other. Further, the tapered shape of the recess 45 reduces the filling volume of the potting material 49.

Finally, the lower side of the tab 21 in the receptacle 44 is flattened upward to become thinner as compared with conventional connectors, and the leading end of the tab 21 projects at the position deviated up from the center of the recess 45. Therefore, the injection nozzle 52 is very easily insertable. As a result, the potting material 49 can be filled without adhering to the tab 21 as a connecting portion of the terminal fitting 20. Therefore, connectability of the terminal fitting is not affected adversely. Further, the inclined portion 27 where the thickness of the terminal fitting 20 changes is at a position where the recess 45 is filled with the potting material 49 and the terminal fitting having the same thickness as before extends up to the interior of the recess 45. Thus, the rigidity of the terminal fitting 20 is maintained and the terminal fitting is least affected by curing shrinkage.

The tab 21 of the terminal fitting 20 is formed with the inclined portion 27 gradually thickened toward the first L-shaped bend 24 and the slant 61 for receiving the inclined portion 27 is formed in the above embodiment. However, the inclined portion 27 and the slant 61 may be formed stepwise by surfaces at an angle different from 0° or 180°, preferably substantially orthogonal to connecting surfaces.

The recess 45 and steps 47 are formed in the back wall of the receptacle 44 in the above embodiment. However, the recess and the steps need not be formed.

The receptacle 44 has a cylindrical shape in the above embodiment. However, the receptacle may be, for example, in the form of a rectangular tube.

The terminal fitting is a single plate in the above embodiment. However, the terminal fitting may be, for example, composed of a plurality of bars.

The housing is molded with the terminal fitting as an insert in the above embodiment. However, the invention may be applied for connectors in which a terminal fitting is press-fit into a housing, and can be widely used for connectors in which a recess is formed at the back of a receptacle and filled with a potting material.

Although the steps 47 are formed at the opening edge portion of the recess 45, steps 47 need not be formed.

What is claimed is:

1. A method for producing a connector, comprising:
providing a terminal fitting having opposite first and second ends and first and second substantially L-shaped bends between the ends, a tab between the first end and the first bend extending in a connecting direction, the tab having an inclined surface obliquely extending from a position slightly closer to the first bend than a central part in such a manner to gradually decrease a thickness of the tab at positions farther from the first bend;
placing the tab in a tab insertion hole of a first molding die along an insertion direction substantially parallel to the connecting direction so that the inclined surface of the terminal fitting is positioned on at least one corresponding slant formed in the first die;
closing a second molding die on the first molding die so that a cavity for forming a housing of the connector is formed between the first and second dies, the closing of the second molding die sandwiching and fixing the terminal fitting between mating faces of the first and second dies; and
injecting resin through a gate in the second molding die and into the cavity substantially in the insertion direction in which the tab is inserted into the tab insertion hole so that the resin exerts a force upon a portion of the terminal fitting between the first and second bends in a pressing direction substantially parallel to the insertion direction of the tab into the tab insertion hole and so that the force of the resin presses the inclined surface of the terminal fitting against the slant and the resin forms an integral matrix surrounding portions of the terminal fitting in the cavity.

2. The method of claim 1, wherein the terminal fitting has a fixing portion for fixing the connector to a mounting part and a coupling joined respectively to the tab and the fixing portion by the first and second substantially L-shaped bends configured so that the tab and the fixing portion are substantially parallel, the method comprising positioning the first bend in the cavity and positioning the second bend outside the cavity.

3. The method of claim 2, wherein a fitting pressing portion sandwiches and fixes the coupling of the terminal fitting when closing the second die.

* * * * *